United States Patent
Tailpied et al.

(10) Patent No.: US 9,970,324 B2
(45) Date of Patent: May 15, 2018

(54) TOOL AND METHOD FOR FRONTAL UNSCREWING OF A LINK NUT IN A TWIN-SPOOL TURBINE

(71) Applicant: SNECMA, Paris (FR)

(72) Inventors: Fabrice Tailpied, Verneuil sur Seine (FR); Michel Bertin, Combs la Ville (FR); Jean-Michel Couture, Guyancourt (FR); Herve Dagron, Le Gue de Longroi (FR); Roland Manchon, Draveil (FR); Cedric Mustiere, Bu (FR)

(73) Assignee: SNECMA, Paris (FR)

( * ) Notice: Subject to any disclaimer, the term of this patent is extended or adjusted under 35 U.S.C. 154(b) by 78 days.

(21) Appl. No.: 14/397,361

(22) PCT Filed: May 2, 2013

(86) PCT No.: PCT/FR2013/050978
§ 371 (c)(1),
(2) Date: Oct. 27, 2014

(87) PCT Pub. No.: WO2013/164551
PCT Pub. Date: Nov. 7, 2013

(65) Prior Publication Data
US 2015/0082633 A1    Mar. 26, 2015

(30) Foreign Application Priority Data
May 2, 2012  (FR) ..................... 12 54028

(51) Int. Cl.
*B23P 19/04* (2006.01)
*F01D 25/28* (2006.01)
(Continued)

(52) U.S. Cl.
CPC ............ *F01D 25/285* (2013.01); *B25B 13/48* (2013.01); *B25B 21/002* (2013.01); *F01D 5/066* (2013.01);
(Continued)

(58) Field of Classification Search
CPC ............. F05D 2230/70; F05D 2230/64; F05D 2230/68; F05D 2230/60; B23P 19/042;
(Continued)

(56) References Cited

U.S. PATENT DOCUMENTS 2,852,652 A    9/1958    Rose et al.
5,473,883 A   12/1995    Naudet
(Continued)

FOREIGN PATENT DOCUMENTS

| | | |
|---|---|---|
| FR | 2 824 362 A1 | 11/2002 |
| FR | 2 857 708 A1 | 1/2005 |
| GB | 2 283 535 A | 5/1995 |

OTHER PUBLICATIONS

International Search Report dated Jun. 26, 2013, in PCT/FR13/050978 filed May 2, 2013.

*Primary Examiner* — Christopher Besler
(74) *Attorney, Agent, or Firm* — Oblon, McClelland, Maier & Neustadt, L.L.P.

(57) ABSTRACT

A method for unscrewing a link nut of an HP rotor of a twin-spool turbine, including a front fan, an intermediate casing, a HP module with a HP rotor, and a LP turbine module, the intermediate casing including a support bearing for the HP rotor, the rotor being retained in the bearing by the link nut, the method including: placing an unscrewing tool in front of the link nut after having removed the fan and released access to the nut from the front; with rotation of the HP rotor locked and the frontal unscrewing tool including a socket spanner including teeth having a shape that comple- (Continued)

ments that of teeth of the link nut, attaching a mounting for the socket spanner to the intermediate casing, the socket spanner being rotatably mounted on the mounting, and applying an unscrewing torque to the socket spanner. An unscrewing tool implements the method.

3 Claims, 4 Drawing Sheets

(51) Int. Cl.
 *B25B 13/48* (2006.01)
 *F01D 5/06* (2006.01)
 *B25B 21/00* (2006.01)
(52) U.S. Cl.
 CPC ........ *B23P 19/042* (2013.01); *F05D 2230/70* (2013.01); *Y10T 29/4932* (2015.01)
(58) Field of Classification Search
 CPC ...... B23P 19/06; B23P 19/065; F01D 25/285; F01D 5/066
 See application file for complete search history.

(56) References Cited

U.S. PATENT DOCUMENTS

| | | |
|---|---|---|
| 2005/0013696 A1 | 1/2005 | Le Jeune et al. |
| 2005/0100258 A1 | 5/2005 | Brossier et al. |
| 2005/0249443 A1 | 11/2005 | Brossier et al. |
| 2012/0151735 A1* | 6/2012 | Thomas ................ B25B 27/062 29/426.5 |

\* cited by examiner

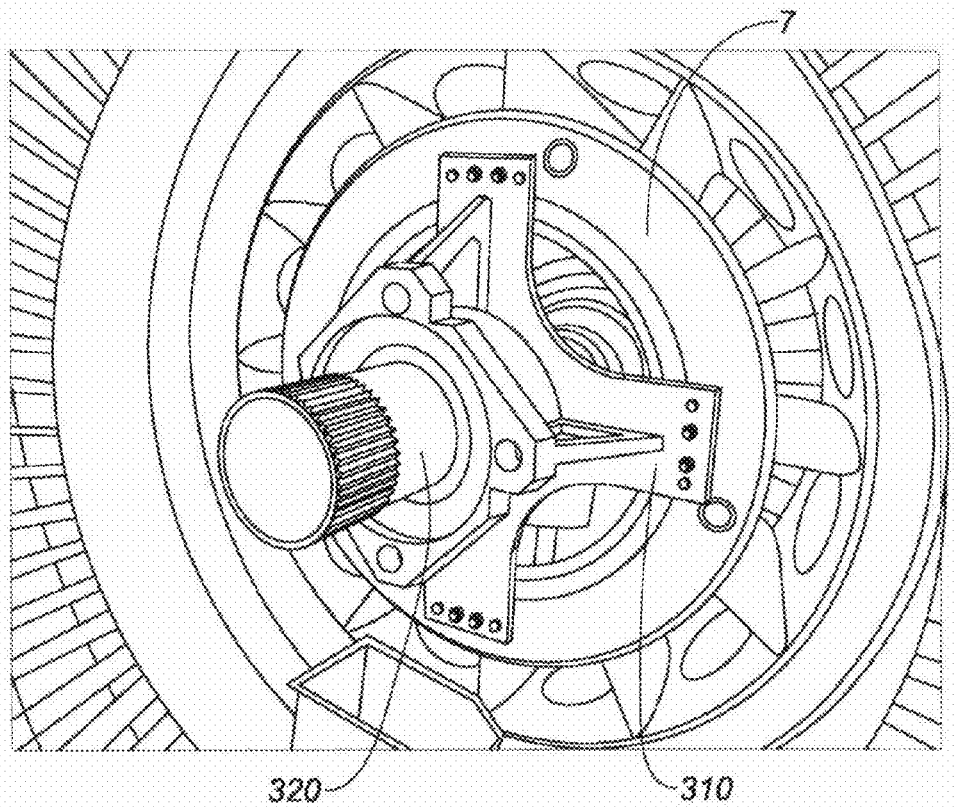
Fig. 8
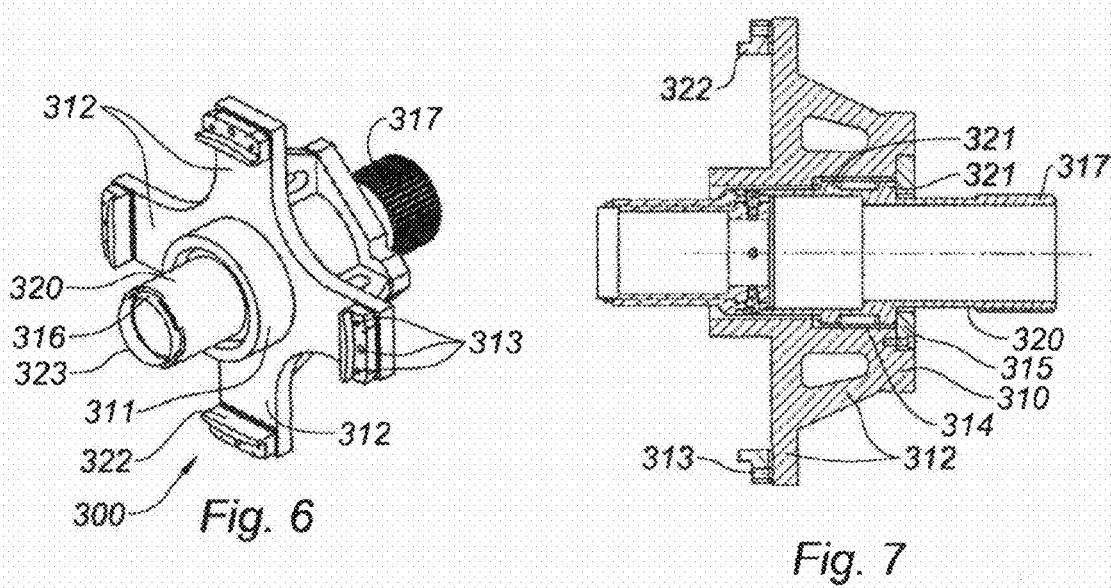
Fig. 6
Fig. 7

TOOL AND METHOD FOR FRONTAL UNSCREWING OF A LINK NUT IN A TWIN-SPOOL TURBINE

TECHNICAL FIELD OF THE INVENTION

The present invention relates to dismantling a gas turbine engine, in particular removing the nut connecting the high-pressure rotor to a bearing in a twin-spool, front-fan turbine.

PRIOR ART

A twin-spool, front-fan turbine comprises two coaxial rotors supported by bearings housed in the hubs of two structural casing elements: referred to the art as the intermediate casing and the exhaust casing. At the front of the engine, the bearings are mounted in the intermediate casing and, at the rear, one or more bearings are housed in the exhaust casing. In an engine such as the CFM56, the rotating assemblies are thus mounted on five bearings: three at the front and two at the rear. At the front, the fan shaft and the shaft of the low-pressure (LP) rotor are respectively mounted in the two first bearings. The high-pressure (HP) rotor is supported by bearing No. 3, downstream of the first two. At the rear, this same HP rotor is supported by an inter-shaft bearing and the shaft of the LP rotor is supported by a bearing mounted in the hub of the exhaust casing.

After a period of operation, each engine is sent to the workshop for example for a complete overhaul, in which it is entirely dismantled and each part is cleaned, repaired or replaced if necessary. Dismantling comprises several steps, including that of removing the LP turbine module at the rear and then the module formed by the HP spool. The rotor of the HP spool comprises an upstream journal which is retained in bearing No. 3 by a connecting nut which must be unscrewed. This operation has a certain degree of difficulty per se due to the central position of the nut in the engine and the relative inaccessibility of this part. The connecting nut is a cylindrical, threaded part which serves to immobilize the upstream end in the form of a journal of the HP rotor with respect to the inner ring of the ball bearing. This nut comprises four teeth cut into the cylindrical wall and located in the upstream extension of the threaded part.

The standard procedure starts with removing the LP turbine module to the rear and extracting the LP shaft, also to the rear. Access to the connecting nut is then possible via the central passage left free by the LP shaft. After putting it in place a device replacing the bearing which has been removed and a guiding tube, an appropriately shaped tool provided with two retractable lugs at the end of a cylindrical tube is introduced into this passage as far as the nut, then the two lugs are deployed radially such that they engage against two of the four teeth of the connecting nut. As the HP rotor is immobilized against rotation by a wedge, turning the tool about its axis allows the nut to be unscrewed.

This operation is delicate in as much as the teeth of the nut must not be damaged and the nut must not be deformed. To that end, the instructions of the engine manufacturer prescribe a maximum torque to be applied.

If the connecting nut cannot be unscrewed in this way, the procedure then consists in removing the assembly consisting of the fan and the low-pressure compressor in order to gain access to the nut via the front of the engine. Once this access is open, an appropriately shaped tool is introduced along the axis of the engine as far as the connecting nut. The head of the tool is adapted to the shape of all the teeth of the nut, such that it is possible to apply a larger torque than before and increase the chances of managing to loosen it.

However, if the connecting nut can still not be removed by this operation, it then has to be cut. Cutting the nut, which is not an inexpensive or straightforward solution, is to be avoided as not only must the nut be replaced but there is a risk of the resulting chips and filings contaminating the gearing located in the immediate vicinity, which would require these parts to be removed and cleaned. This gearing, known as the IGB, serves to drive the radial arm connected to the gearbox for the accessories, the AGB.

With increasing duration or number of operating cycles of the engines, and the use thereof, where relevant, in aggressive environments, it is observed that dismantling now leads more often to the connecting nut being cut due to seizing of the nut.

Seizing of the connecting nut is due to multiple factors:
coking of the grease resulting from heating of the part,
deformation of the nut during loosening, due to the torsion forces generated by the permitted torque limit being exceeded,
oxidation of the parts of the nut forming the centering tracks with the journal and the inner ring of the rolling element of the bearing.

The present applicant has set themselves the object of developing a method for dismantling an engine, avoiding as far as possible the need to cut the nut.

DISCLOSURE OF THE INVENTION

The invention relates to a twin-spool, twin-flow turbine comprising a front fan, an intermediate casing, an HP module with an HP rotor and a LP turbine module. The intermediate casing of the engine comprises in particular a bearing supporting the HP rotor, the latter being retained in the bearing by a connecting nut. The method of dismantling such an engine comprises a plurality of steps with, after having released access to the nut, a prior step of heating the nut and introducing a tool for unscrewing the latter along the axis of the engine.

Prior heating to a moderate temperature makes it possible to soften the coked oils gluing together the thread of the connecting nut and that of the journal and also to allow a differential expansion between the cylindrical elements in contact with one another with a tight fit. After having removed the LP turbine module with its shaft, a tubular heating means is introduced into the central space left free by the LP turbine module, along the axis of the engine, and the nut is heated from the inside.

The invention relates to a method for unscrewing the connecting nut of the HP rotor from the front of the engine; it is characterized in that, with the HP rotor being prevented from rotating and the frontal unscrewing tool comprising a tubular wrench provided with teeth having a shape which complements that of the teeth of the connecting nut, a support for the tubular wrench is fixed to the intermediate casing, the tubular wrench is rotatably mounted on the support, and an unscrewing torque is applied to said tubular wrench.

More precisely, with the LP turbine module having been dismantled beforehand, the HP rotor is prevented from rotating by a tubular element engaged in the space released by the LP module. The tubular element is fixed at one end to the casing of the HP module and at the other end is secured in rotation with the HP rotor.

The solution of the invention makes it unnecessary to bear on the IGB gearing located in the vicinity and to risk damaging the teeth thereof.

The unscrewing tooling for implementing the method of the invention comprises a support for a tubular wrench, comprising a cylindrical barrel and four branches extending in a star shape from the barrel, a tubular wrench provided with teeth which is mounted removably in the barrel of the support, the tubular wrench being locked axially with respect to the support, and an anti-rotation tool separate from the support and arranged to block the HP rotor against any rotational movement about its axis.

Advantageously, the anti-rotation tool comprises a tubular element provided with wedges, said tubular element being adapted to be introduced inside the HP rotor to immobilize said rotor against rotation.

As a safety measure, it is checked beforehand that the connecting nut has not seized, by means of a break-action torque wrench calibrated to the maximum permitted torque.

BRIEF DESCRIPTION OF THE FIGURES

The method for removing the connecting nut will now be described in more detail, according to one embodiment given by way of non-limiting example, the description being made with reference to the appended drawings, in which:

FIGS. 6, 7 and 8 represent an exemplary embodiment of the device for unscrewing the connecting nut from the front of the engine, with the support and the tubular wrench.

DETAILED DESCRIPTION OF THE INVENTION

Figure 1:
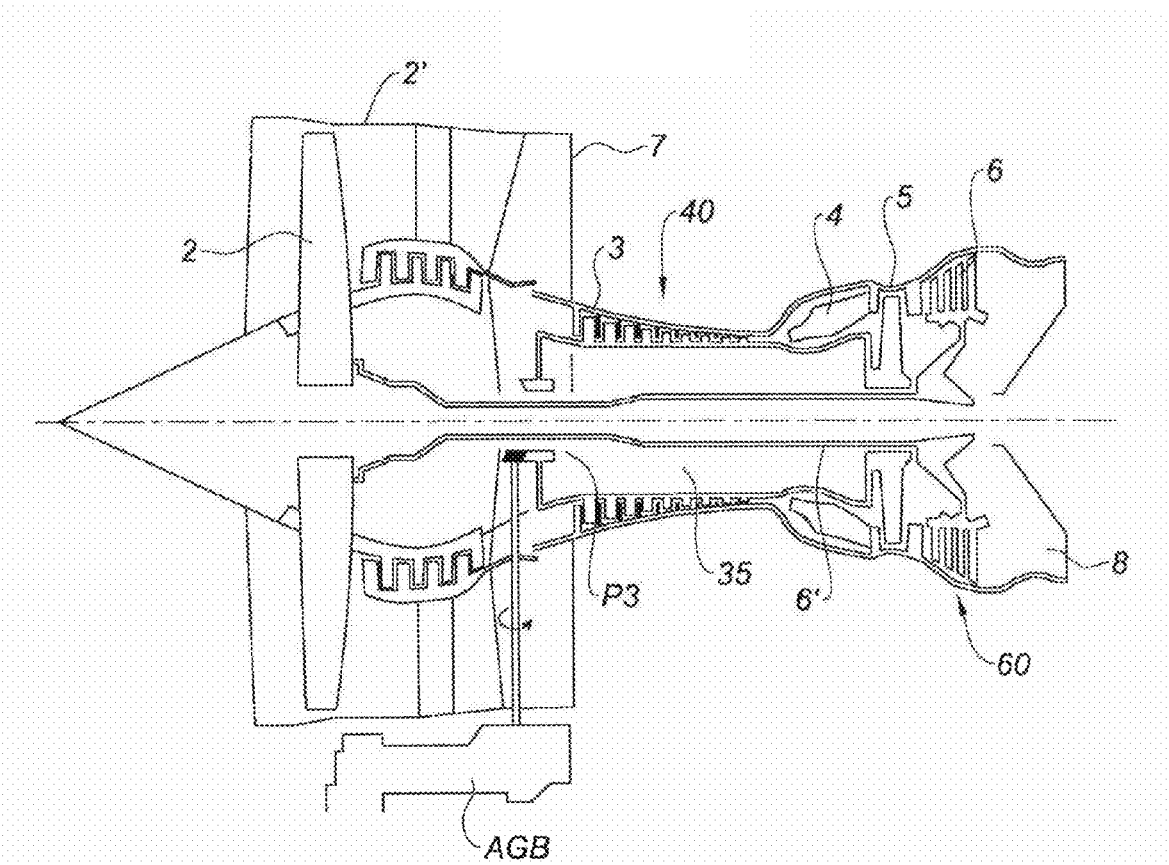
FIG. 1 is a representation in axial section of an engine to which the method of the invention applies.

The section of FIG. 1 represents a twin-spool, front-fan turbine 1. From the right to the left in the figure, that is to say from upstream to downstream in the direction of the gas streams, the rotor of the fan 2 can be seen inside the fan casing 2'. The fan duct delimited by the casing is divided into two concentric annular ducts, one for the primary flow passing through the engine, the other for the secondary flow which is ejected without having been heated. The primary flow is compressed in the low-pressure booster compressor and then in the HP compressor 3. It is admitted into the combustion chamber 4 where it is heated by the combustion of a fuel. The hot gases which emerge therefrom are distributed successively in the HP turbine 5 and the LP turbine 6 before being ejected. The rotors are supported in the two structural casings, which are the intermediate casing 7—to which the fan casing is fixed upstream—and the exhaust casing 8 at the rear.

The fan 2 with the booster compressor and the LP turbine 6 are connected by an LP turbine shaft 6'. The turbine shaft 6' and the turbine 6 with its casing form, with the exhaust casing 8, the LP turbine module 60.

The HP compressor 3 and the HP turbine 5 form the HP rotor 35 inside the HP spool or module 40. The latter also comprises the combustion chamber 4. The HP rotor 35 is mounted upstream in the bearing P3 which is supported in the hub of the intermediate casing 7. At this level is also situated the gearbox, termed IGB, for driving the accessories gearbox, termed AGB, via a radial shaft housed in an arm of the intermediate casing.

Figure 2:
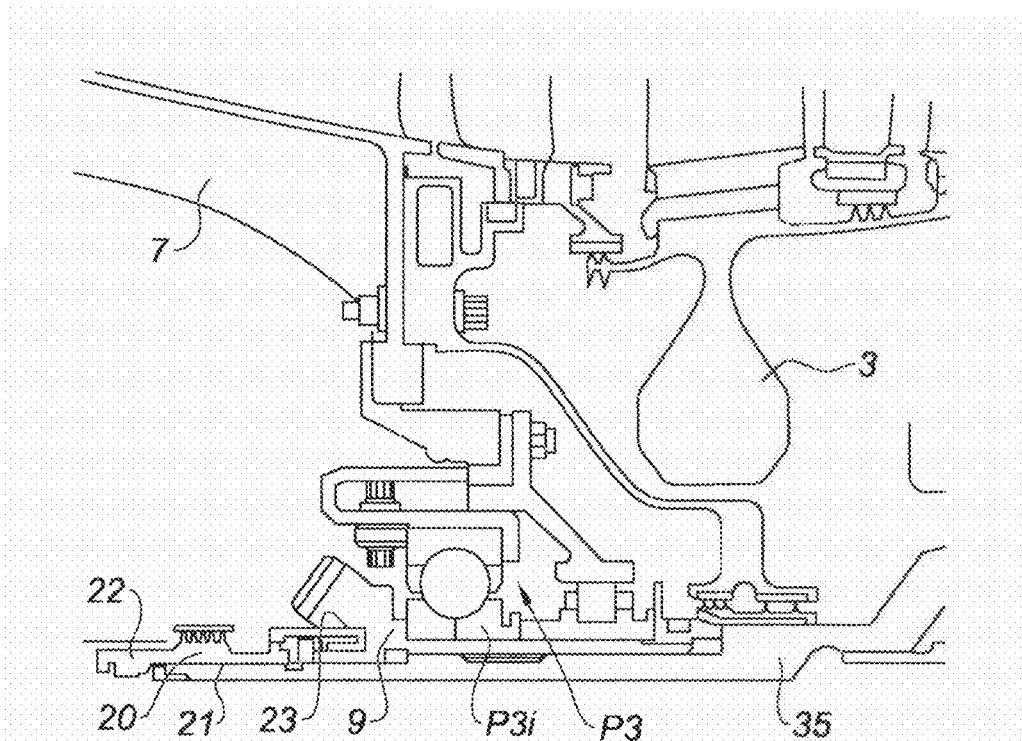
FIG. 2 is an axial half-section view showing, in situ, the nut which connects the HP rotor to the front bearing and which is to be removed.

FIG. 2 shows this part of the engine in more detail; the upstream end of the rotor 35 is housed in the inner ring P3i of the rolling element of the bearing P3. The cylindrical body of the pinion 9 of the IGB gearing is interposed between the rotor and the ring P3i. The connecting nut 20 is screwed at 21 to the end of the rotor 35 and axially immobilizes the latter with respect to the intermediate casing 7. The connecting nut 20 is thus a cylindrical part with an internal thread 21, an outer centering track 23 and teeth 22 in the upstream axial extension of its cylindrical wall.

Figure 3:
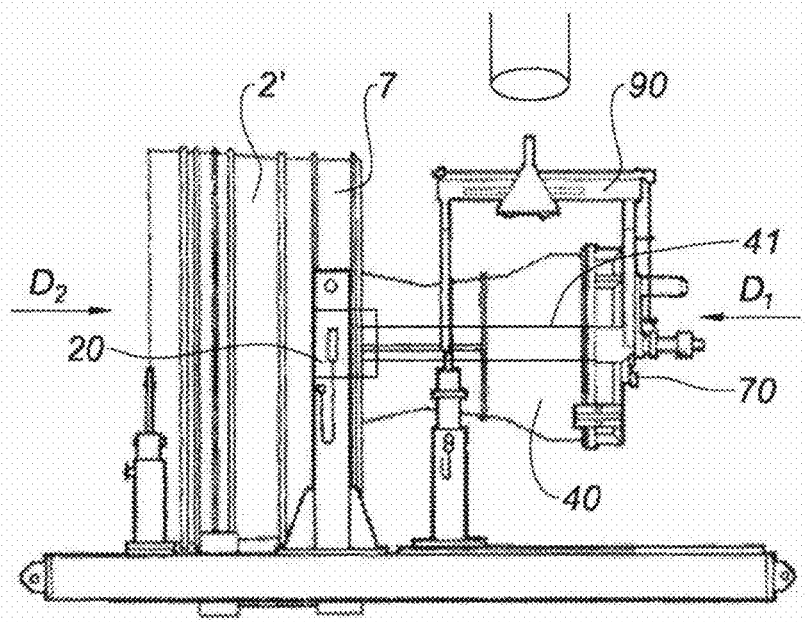
FIG. 3 is a schematic side view of the engine during removal.

The dismantling of the HP module 40 comprises the prior removal of the LP module 60 to release access to the connecting nut 20 and put in place a disk 70 for retaining the HP rotor in its casing. This disk replaces the downstream inter-shaft bearing which has been removed with the LP module 60. The state of the engine is represented schematically in FIG. 3. The front, i.e. the fan casing and intermediate casing 7, is fixed to a frame and the rear part which is to be detached from the intermediate casing is the HP module 40. It is attached to a beam 90 suspended from a hoist.

The following step consists in introducing the means 100 for heating the nut 20 into the guiding tube 41 placed in the central space left free by the shaft of the LP turbine.

Figure 4:
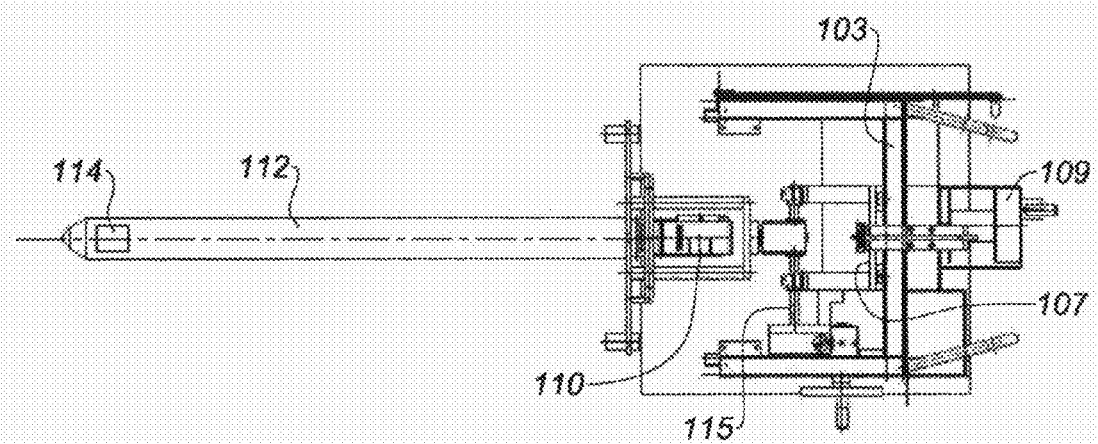
FIGS. 4 and 5 represent an exemplary embodiment of the device for heating the connecting nut.
Figure 5:
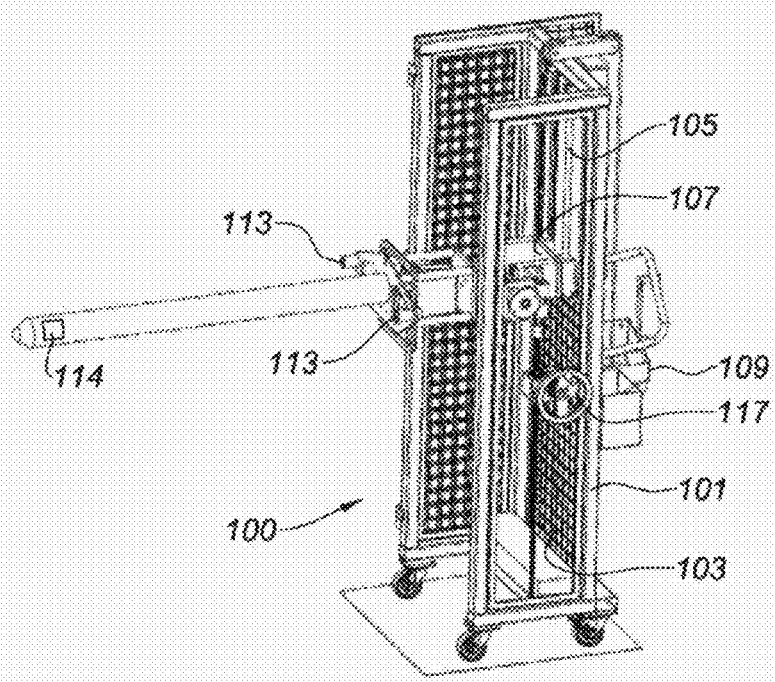

This means 100 is described hereinafter with reference to FIGS. 4 and 5.

It comprises a carriage 101 mounted on casters and with a vertical wall 103 provided with vertical rails 105 guiding a vertically movable platform 107. The platform is suspended on a cable which is connected by a set of pulleys to a manually controlled winch 109 allowing the height thereof to be adjusted. The platform 107 supports the heating assembly composed of a heater 110 and a hollow tube 112. The heater is arranged at the proximal end of the tube in order to produce a flow of air into the hollow tube 112 directed towards its other end. The latter is open laterally with slots 114 cut into the wall of the tube 112 about its axis. The heating assembly also comprises a means for registering and positionally securing the tube when it is introduced into the engine. This means is formed here by two projections 113 on a transverse plate which cooperate with corresponding notches made in the retaining disk 70.

The heating assembly is mounted on the platform via a horizontal rotation axle 115 in such a way that it can be oriented in a vertical stowed position, in which it is retracted into the carriage, or else in a horizontal active position. The rotation of the heating assembly is controlled by a handwheel 117 arranged laterally on the carriage. An appropriate mechanism transmits the rotational movement of the handwheel into the rotation of the heating assembly about the horizontal axle 115.

To heat the connecting nut 20, the carriage is placed facing the engine along the axis of the latter. The heating element is then placed horizontally and introduced into the guiding tube 41 until the projections 113 come to butt in their respective housing made in the retaining disk 70. The end of the tube is then at the height of the nut. The heater is then set in operation and hot air is blown through the slots 114 in the tube, in the direction of the nut. The rise in temperature of the nut is monitored; it must not exceed 130° C. When the temperature is reached, the heater is deactivated and the carriage removed and put away.

Heating is carried out on the nut 20.

The second step is aimed at unscrewing the nut with the introduction of the tooling from the front of the engine after having removed the fan 2.

Then, the frontal unscrewing tool 300 is placed on the engine, FIGS. 6, 7 and 8. The tool comprises two main parts: a wrench support 310, fixed to the casing of the engine, and a tubular wrench 320 which can turn about its axis in the support. The setup is represented in FIG. 8. The support 310 comprises four branches 312 extending in a star shape from a cylindrical barrel 311. The support comprises removable shoes 322. The operator mounts the shoes appropriate to the engine type, enabling him to obtain the correct interfaces for fastening to the casing. The branches and the shoes 322 are pierced at their end with holes 313 for the passage of screws for fastening to the intermediate casing. The tubular wrench 320 is housed in the cylindrical barrel so as to be blocked axially but capable of turning free about its axis. The wrench comprises two circular bearing surfaces 321 which are placed in the corresponding ring 314. A removable annulus 315 closes upstream the space of the groove so as to axially block the wrench in the support. The wrench comprises at one end four teeth 316 having a shape which complements that of the teeth 22 of the connecting nut 20 and at its other end a pinion 317 for turning it. The wrench also comprises a thin ring 323 which serves to push away the brake of the nut 20 before loosening.

Figure 9:
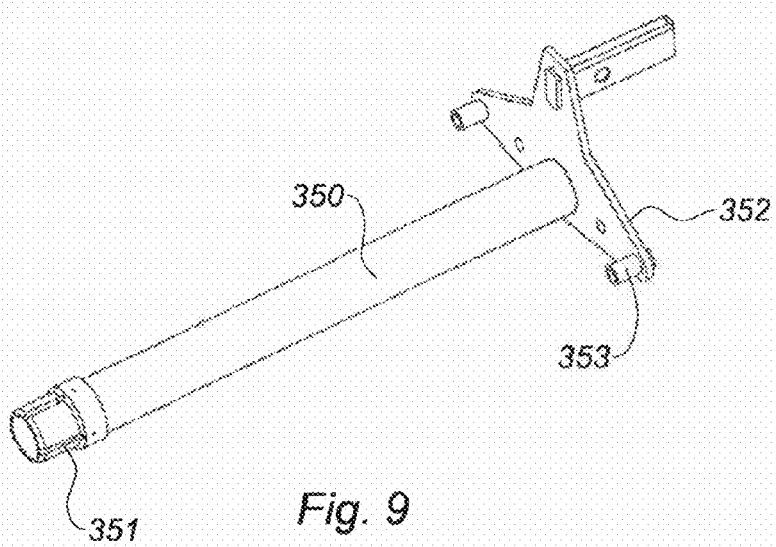
FIG. 9 shows an isometric view of the tool for preventing the HP rotor from rotating.

Once the tool 300 has been put in place, a securing tube 350, FIG. 9, is arranged inside the HP rotor to prevent it from rotating. This tube comprises a transverse plate with registering projections 353 which come to butt in corresponding notches in the disk 70. At the end of the tube are placed wedges 351 which cooperate with the axial grooves of the HP rotor to immobilize the latter.

The operating mode comprises the following steps:

Heating the connecting nut by means of the heating device 100 to a temperature not exceeding 130° C.

Mounting the support 310 on the intermediate casing and screwing the four branches to the orifices existing thereon.

Introducing the unscrewing wrench 320 into the barrel of the support until the toothed end is engaged between the teeth of the connecting nut.

Axially locking the wrench by means of the annulus 315 on the support.

Preventing the HP rotor 35 from rotating for example by means of a tube similar to the unscrewing tube through the LP turbine, provided with securing wedges.

Putting in place a force multiplier on the pinion 317, for example a Sweeney-type apparatus.

Checking that the connecting nut can be loosened by application of a torque below the limit allowed by the manufacturer, by means of a break-action torque wrench engaged in the Sweeney force multiplier.

If the wrench allows the rotation of the pinion without bending, then the connecting nut has not seized and a pneumatic motor is put in place to drive the pinion.

If the torque wrench indicates that the maximum torque is exceeded, cutting of the connecting nut must be envisioned.

The method of the invention is thus an improvement over the prior art since there is no need to bear on the teeth of the pinion of the IGB gearing. The risks of damage to the teeth of the pinion are eliminated.

The invention claimed is:

1. A method for unscrewing a connecting nut of an HP rotor of a twin-spool gas turbine engine including, in order from a front of the gas turbine engine to a rear of the gas turbine engine, a front fan, an intermediate casing, an HP module including the HP rotor, and a LP turbine module, the intermediate casing including a bearing supporting the HP rotor, the HP rotor being retained in the bearing by the connecting nut, the method comprising:

removing the fan at the front of the gas turbine engine so to provide access to the connecting nut from a front side of the gas turbine engine;

placing a support in front of the connecting nut, the support including a cylindrical barrel and four branches radially extending from the barrel so as to present a star shape, the four branches being integrally connected to each other so as to form a single monolithic piece, a first end of each of the branches being connected to the barrel and a second end of each of the branches being free and presenting a thickness in an axial direction;

mounting removable shoes on the second free ends of the branches, the shoes and the second free ends of the branches including holes;

fastening the second free ends of the branches of the support to the intermediate casing via screws passing through the holes in the shoes and the second free ends of the branches so as to fix the support to the intermediate casing;

inserting a tubular wrench into the barrel of the support such that teeth at a first end of the tubular wrench are engaged with teeth of the connecting nut and the tubular wrench is locked axially with respect to the support, shapes of the teeth of the tubular wrench and the connecting nut being complementary to each other;

inserting an anti-rotation tool in the HP rotor to block the HP rotor against any rotational movement; and applying an unscrewing torque to the tubular wrench;

wherein the removable shoes are selected based on a type of the gas turbine engine.

2. The method as claimed in claim 1, further comprising removing the LP turbine module, wherein the anti-rotation tool is a tubular element engaged in a space released by the LP module, a first end of the anti-rotation tool being fixed to a casing of the HP module and at a second end of the anti-rotation tool being secured in rotation with the HP rotor.

3. The method as claimed in claim 1, wherein each of the shoes includes a protrusion.

* * * * *